(12) United States Patent
Ozeki

(10) Patent No.: US 12,584,426 B2
(45) Date of Patent: Mar. 24, 2026

(54) VARIABLE VALVE DEVICE

(71) Applicant: SUZUKI MOTOR CORPORATION,
Hamamatsu (JP)

(72) Inventor: Hisashi Ozeki, Hamamatsu (JP)

(73) Assignee: SUZUKI MOTOR CORPORATION,
Hamamatsu (JP)

( * ) Notice: Subject to any disclaimer, the term of this
patent is extended or adjusted under 35
U.S.C. 154(b) by 77 days.

(21) Appl. No.: 18/891,714

(22) Filed: Sep. 20, 2024

(65) Prior Publication Data

US 2025/0109699 A1      Apr. 3, 2025

(30) Foreign Application Priority Data

Sep. 28, 2023     (JP) ................................. 2023-167725

(51) Int. Cl.
 F01L 1/24        (2006.01)
 F01L 1/18        (2006.01)
 F16K 1/52        (2006.01)
 F16K 31/524      (2006.01)
(52) U.S. Cl.
 CPC ............. *F01L 1/2416* (2013.01); *F01L 1/181*
 (2013.01); *F16K 1/52* (2013.01); *F16K*
 *31/52408* (2013.01); *F01L 2001/2444*
 (2013.01)
(58) Field of Classification Search
 CPC ......... F01L 1/2416; F01L 1/181; F01L 1/185;
 F01L 1/267; F01L 1/053; F01L
 2001/2444; F01L 2001/186; F01L 2001/0537; F01L 13/0036; F01L 13/00;
 F01L 2305/00; F01L 9/10; F01L 9/40;
 F16K 1/52; F16K 31/52408
See application file for complete search history.

(56) References Cited

U.S. PATENT DOCUMENTS

| | | | | |
|---|---|---|---|---|
| 5,036,807 A | * | 8/1991 | Kaneko | F01L 13/0031 |
| | | | | 123/90.16 |
| 5,036,810 A | * | 8/1991 | Meneely | F01L 13/065 |
| | | | | 123/321 |
| 5,282,443 A | * | 2/1994 | Fujiyoshi | F01L 9/11 |
| | | | | 123/90.39 |
| 6,422,186 B1 | * | 7/2002 | Vanderpoel | F01L 13/0015 |
| | | | | 123/90.46 |

(Continued)

FOREIGN PATENT DOCUMENTS

JP      2009-264199 A     11/2009

*Primary Examiner* — Patrick C Williams
(74) *Attorney, Agent, or Firm* — Stein IP LLC

(57) ABSTRACT

A variable valve device changes a valve lift amount in a
cylinder head. The device includes: a camshaft having plural
cams with different valve lift amounts; plural rocker arms in
contact with the plural cams to move a valve; a switching
mechanism that couples and separates the rocker arms by oil
pressure; and an oil control valve that controls the oil
pressure. The switching mechanism includes a hydraulic
piston moveable forward and backward to couple and sepa-
rate the rocker arms. First and second oil passages extend
from the oil control valve to the hydraulic piston. The first
oil passage includes an oil groove allowing oil to pass at a
predetermined rotation phase of the camshaft. The second
oil passage is opened and closed during forward and back-
ward movement of the hydraulic piston. A bypass passage is
provided for bypassing the oil groove when the second oil
passage is closed.

8 Claims, 12 Drawing Sheets

(56)                    References Cited

U.S. PATENT DOCUMENTS

| | | | |
|---|---|---|---|
| 6,718,940 B2 * | 4/2004 | Usko ...................... | F01L 1/181 |
| | | | 123/90.36 |
| 2014/0130774 A1 * | 5/2014 | Le Forestier ........ | F01L 1/2416 |
| | | | 123/321 |

* cited by examiner 106a   108c   106b 106b   108d   106a

VARIABLE VALVE DEVICE

CROSS-REFERENCE TO RELATED APPLICATIONS

This application is based on and claims priority under 35 USC 119 from Japanese Patent Application No. 2023-167725 filed on Sep. 28, 2023, the contents of which are incorporated herein by reference.

BACKGROUND

The present disclosure relates to a variable valve device.

There is known a variable valve device in which a plurality of rocker arms are coupled to one another to switch a valve operation (for example, see JP2009-264199A). In the variable valve device disclosed in JP2009-264199A, a pair of cams having different lift amounts are formed on a camshaft, and a pair of rocker arms are provided corresponding to the pair of cams. A switching mechanism is coupled to the pair of rocker arms, and a coupling state and a separation state of the pair of rocker arms are switched by applying oil pressure to the switching mechanism. A valve lift amount is changed by switching the cams that lift valves between when the pair of rocker arms are coupled and when the pair of rocker arms are separated.

SUMMARY OF INVENTION

According to an aspect of the present disclosure, there is provided a variable valve device configured to change a valve lift amount in a cylinder head. The variable valve device includes: a camshaft formed with a plurality of cams having different valve lift amounts; a plurality of rocker arms configured to be in contact with the plurality of cams and move a valve; a switching mechanism configured to couple and separate the plurality of rocker arms by oil pressure; and an oil control valve configured to control the oil pressure applied to the switching mechanism. The switching mechanism includes a hydraulic piston configured to be moved forward and backward by the oil pressure such that the plurality of rocker arms are coupled along forward movement of the hydraulic piston, and the plurality of rocker arms are separated along backward movement of the hydraulic piston. A first oil passage and a second oil passage extend from the oil control valve to the hydraulic piston. A part of the first oil passage is formed by an oil groove through which oil is allowed to pass at a predetermined rotation phase of the camshaft. The second oil passage is opened during forward movement of the hydraulic piston and is closed during backward movement of the hydraulic piston. A bypass passage configured to bypass the oil groove when the second oil passage is closed is provided.

DESCRIPTION OF EMBODIMENTS

Figure 1:
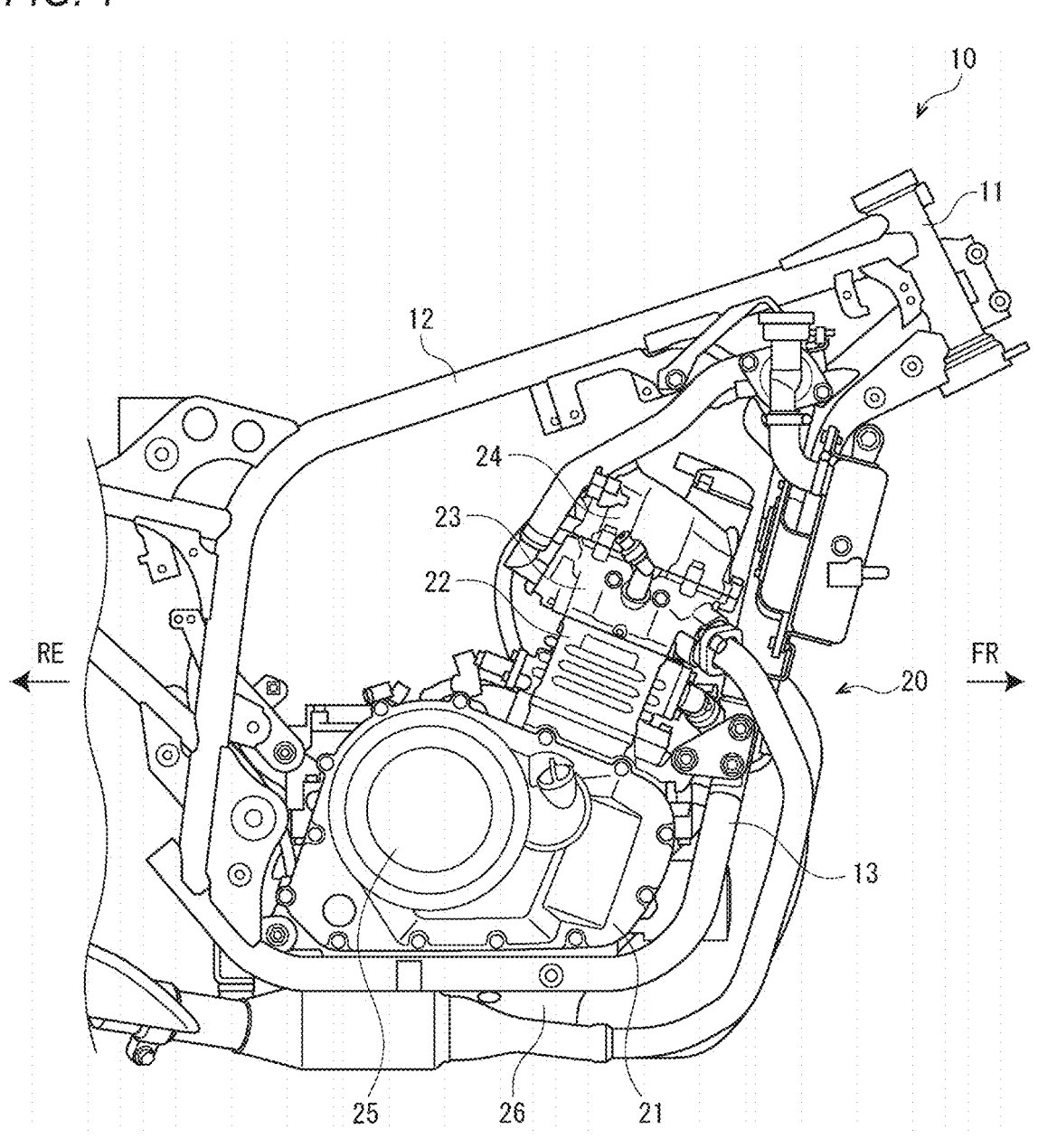
FIG. 1 is a right side view showing an engine and a vehicle body frame according to a present embodiment.

In the above-described variable valve device of JP2009-264199A, the pair of rocker arms are coupled regardless of a rotation phase of the camshaft. Depending on the rotation phase of the camshaft, a valve lift may inhibit coupling of the pair of rocker arms. Even when the pair of rocker arms are coupled while avoiding a valve lift, the pair of rocker arms may not be smoothly separated from each other.

The present disclosure has been made in view of the above circumstances, and an object of the present disclosure is to provide a variable valve device capable of smoothly switching between a coupling state and a separation state of a plurality of rocker arms.

A variable valve device according to one aspect of the present disclosure is provided in a cylinder head and changes a valve lift amount. A plurality of cams having different valve lift amounts are formed on a camshaft, and a plurality of rocker arms for moving valves are configured to be in contact with the plurality of cams. The plurality of rocker arms are coupled and separated by a switching mechanism by oil pressure, and the oil pressure applied to the switching mechanism is controlled by an oil control valve. A hydraulic piston of the switching mechanism is moved forward and backward by the oil pressure such that the plurality of rocker arms are coupled along forward movement of the hydraulic piston, and the plurality of rocker arms are separated along backward movement the hydraulic piston. A first oil passage and a second oil passage extend from the oil control valve to the hydraulic piston. A part of the first oil passage is an oil groove through which the oil is allowed to pass at a predetermined rotation phase of the camshaft, and a bypass passage bypasses the oil groove when the second oil passage is closed. The second oil passage is opened during forward movement of the hydraulic piston and is closed during backward movement of the hydraulic piston. When the oil is supplied from the oil control valve to the hydraulic piston, the hydraulic piston is moved forward at a predetermined rotation phase of the camshaft by oil pressure in the first oil passage. When the second oil passage is opened during forward movement of the hydraulic piston and the plurality of rocker arms are coupled, a coupling state is maintained by oil pressure in the second oil passage. On the other hand, when the oil is discharged from the hydraulic piston to the oil control valve, the oil pressure in the first and second oil passages is released and the hydraulic piston is moved backward. The second oil passage is closed during backward movement of the hydraulic piston, and the oil groove of the first oil passage does not allow the oil to pass therethrough at a phase other than the predetermined rotation phase of the camshaft. At this time, the oil is continuously discharged from the hydraulic piston through the bypass passage that bypasses the oil groove, so that the plurality of rocker arms are smoothly separated from one another.

Embodiment

Figure 2:
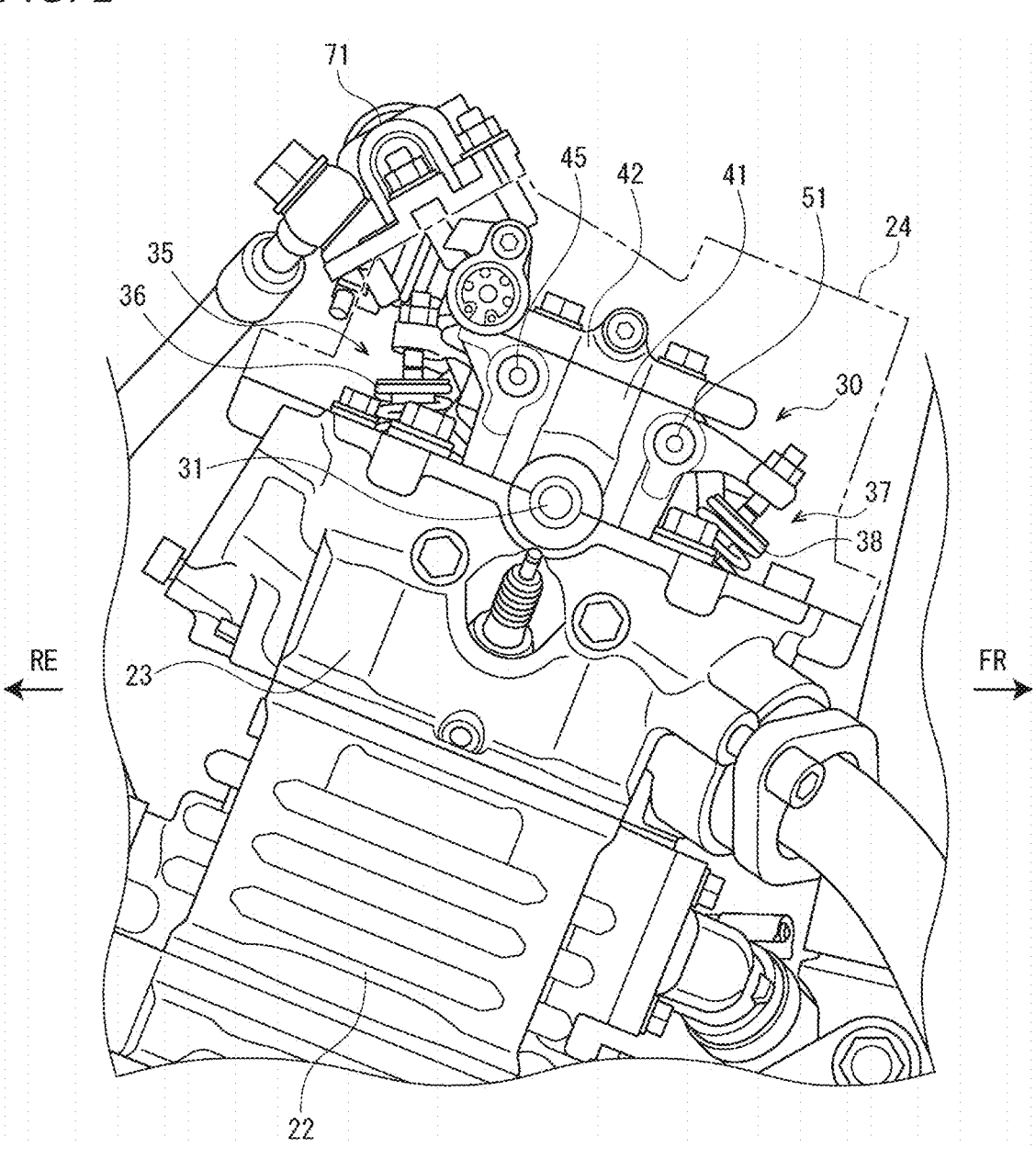
FIG. 2 is a right side view showing an upper portion of the engine from which a cylinder head cover is removed according to the present embodiment.
Figure 3:
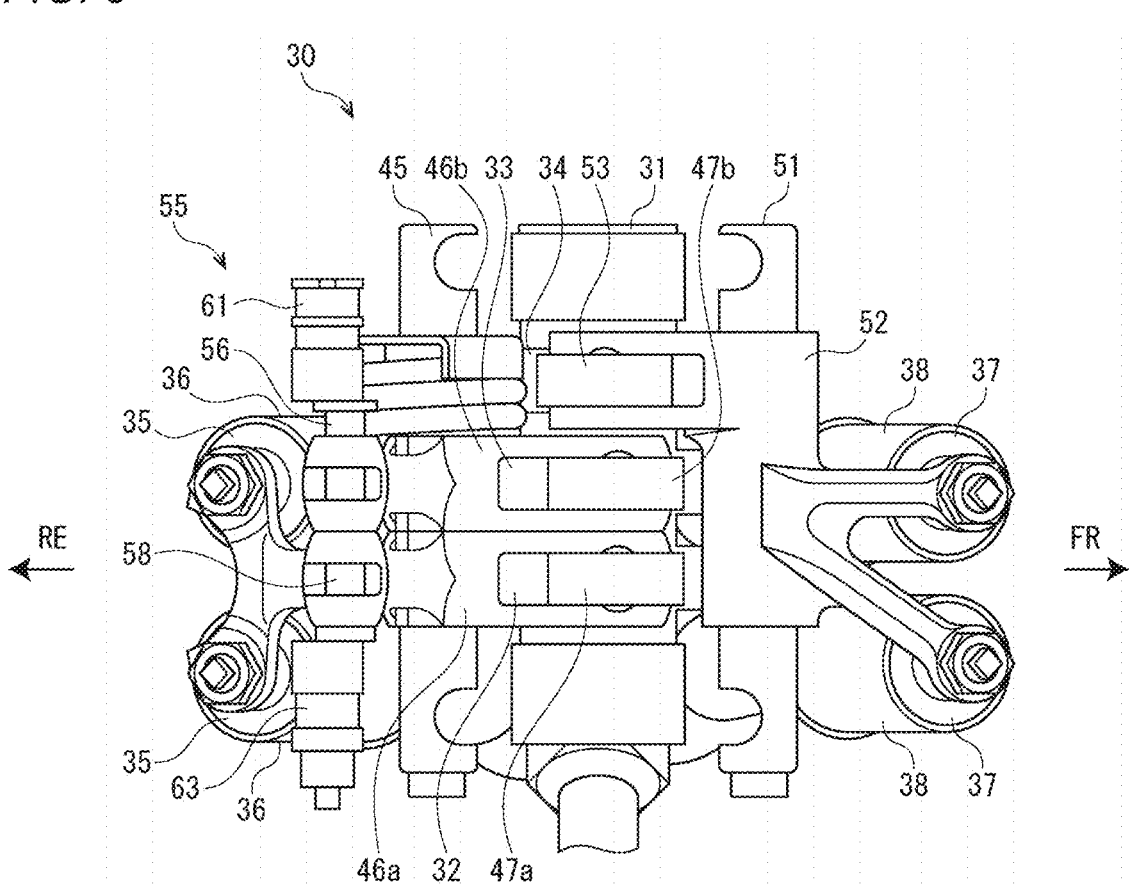
FIG. 3 is a schematic top view showing a variable valve device according to the present embodiment.

Hereinafter, a straddle-type vehicle according to an embodiment will be described with reference to the accompanying drawings. FIG. 1 is a right side view showing an engine and a vehicle body frame according to the present embodiment. FIG. 2 is a right side view showing an upper portion of the engine from which a cylinder head cover is removed according to the present embodiment. FIG. 3 is a schematic top view showing a variable valve device according to the present embodiment. In the following drawings, an arrow Fr indicates a vehicle front side, an arrow Re indicates a vehicle rear side, an arrow L indicates a vehicle left side, and an arrow R indicates a vehicle right side.

As shown in FIG. 1, the straddle-type vehicle includes various components such as an engine 20 and an electrical system which are mounted on a cradle type vehicle body frame 10. The vehicle body frame 10 includes a main tube 12 that extends rearward from an upper portion of a head pipe 11 and then is bent downward, and a down tube 13 that extends downward from a lower portion of the head pipe 11 and then is bent rearward. A rear end portion of the down tube 13 is joined to a lower end portion of the main tube 12 to form an installation space for the engine 20 inside the vehicle body frame 10. The main tube 12 supports a rear side of the engine 20, and the down tube 13 supports a front side and a lower side of the engine 20.

The engine 20 is a four-valve two-cylinder engine, and includes a crankcase 21, a cylinder 22 provided on the crankcase 21, a cylinder head 23 provided on the cylinder 22, and a cylinder head cover 24 provided on the cylinder head 23. A clutch cover 25 that covers a clutch (not shown) from a side is attached to a right side surface of the crankcase 21. A magnet cover (not shown) that covers a magnet (not shown) from a side is attached to a left side surface of the crankcase 21. An oil pan 26 that stores oil is attached to a lower surface of the crankcase 21.

As shown in FIG. 2, left and right valve operating chambers are formed inside the cylinder head 23 and the cylinder head cover 24 for each cylinder. A variable valve device 30 is mounted in each of the left and right valve operating chambers. The variable valve device 30 is capable of changing valve lift amounts of an intake valve 35 and an exhaust valve 37 by oil pressure. The variable valve device 30 includes a camshaft 31 shared by an intake side and an exhaust side. A pair of partition walls (not shown) protrude from a bottom surface of the cylinder head 23 for each cylinder, and a pair of cam housings 41 are attached on the pair of partition walls. The camshaft 31 is supported in a rotatable manner by mating surfaces between the plural partition walls and the cam housings 41.

Four (only one is shown in FIG. 2) intake valves 35 are installed on a rear side of the camshaft 31, and four (only one is shown in FIG. 2) exhaust valves 37 are installed on a front side of the camshaft 31. The intake valve 35 is pressed in a valve closing direction by a valve spring 36, and the exhaust valve 37 is pressed in a valve closing direction by a valve spring 38. A low-speed cam 32, a high-speed cam 33, and an exhaust cam 34 (see FIG. 3) are formed on an outer circumferential surface of the camshaft 31. Each of the cams 32 to 34 has a plate shape in which a cam ridge protrudes from a part of a base circle, and the cam ridge of the high-speed cam 33 is higher than the cam ridge of the low-speed cam 32.

An intake-side rocker shaft 45 and an exhaust-side rocker shaft 51 are supported on upper portions of the cam housings 41. The intake-side rocker shaft 45 and the exhaust-side rocker shaft 51 are located above the camshaft 31, and the intake-side rocker shaft 45 and the exhaust-side rocker shaft 51 extend parallel to the camshaft 31. An upper housing 42 is attached to an upper portion of the cam housing 41, and a hydraulic piston 61 and a spring pin 63 (see FIG. 6) are accommodated in the upper housing 42. An oil control valve 71 that controls oil pressure of the variable valve device 30 is installed on a rear side of an upper surface of the cylinder head cover 24.

As shown in FIG. 3, the intake-side rocker shaft 45 is located in the rear of the camshaft 31, and the exhaust-side rocker shaft 51 is located in front of the camshaft 31. Two types of rocker arms 46a and 46b (only one for each is shown in FIG. 3) are supported in a swingable manner by the intake-side rocker shaft 45, and a rocker arm 52 (only one is shown in FIG. 3) is supported in a swingable manner by the exhaust-side rocker shaft 51. The rocker arm 46a on an intake side and the rocker arm 52 on an exhaust side are formed in a seesaw shape having a point of effort and a point of load, and the rocker arm 46b on the intake side is formed to be the point of effort of the rocker arm 46a.

A roller 47a that is in rolling contact with the low-speed cam 32 is supported in a rotatable manner at one end of the rocker arm 46a on the intake side, and a pair of the intake valves 35 are coupled to the other end of the rocker arm 46a which is bifurcated. A roller 47b that is in rolling contact with the high-speed cam 33 is supported in a rotatable manner at one end of the rocker arm 46b on the intake side, and the intake valves 35 are not coupled to the other end of the rocker arm 46b. A roller 53 that is in rolling contact with the exhaust cam 34 is supported in a rotatable manner at one end of the rocker arm 52 on the exhaust side, and a pair of the exhaust valves 37 are coupled to the other end of the rocker arm 52 which is bifurcated. The rocker arms 46a and 46b are formed in a manner capable of being coupled to each other.

When an engine rotates at a low-speed and a medium speed, the rocker arms 46a and 46b are not coupled. Therefore, the rocker arm 46a is swung by the low-speed cam 32, and the rocker arm 46b is swung by the high-speed cam 33. Since the pair of intake valves 35 are coupled to the rocker arm 46a, the pair of intake valves 35 are moved in response to rotation of the low-speed cam 32. Since the cam ridge of the low-speed cam 32 is small, valve lift amounts of the pair of intake valves 35 are small. Since the intake valves 35 are not coupled to the rocker arm 46b, the rocker arm 46b is idle in response to rotation of the high-speed cam 33.

When the engine rotates at a high-speed, the rocker arms 46a and 46b are coupled to each other. Therefore, the rocker arms 46a and 46b are swung integrally by the high-speed cam 33. Since the pair of intake valves 35 are coupled to the rocker arm 46b via the rocker arm 46a, the pair of intake valves 35 are moved in response to rotation of the high-speed cam 33. Since the cam ridge of the high-speed cam 33 is large, valve lift amounts of the pair of intake valves 35 are large. In this manner, the low-speed cam 32 and the high-speed cam 33 that move the intake valves 35 are switched by switching a coupling state of the rocker arms 46*a* and 46*b*.

The variable valve device 30 includes a switching mechanism 55 that switches between a coupling state and a separation state of the rocker arms 46*a* and 46*b* by oil pressure. The switching mechanism 55 includes a coupling pin 56 installed in a storage hole of the rocker arm 46*b* and a return pin 58 installed in a storage hole of the rocker arm 46*a*. The switching mechanism 55 includes the hydraulic piston 61 that is in contact with the coupling pin 56 from one side in a left-right direction, and the spring pin 63 that is in contact with the return pin 58 from the other side in the left-right direction. The hydraulic piston 61 can be moved forward and backward by oil pressure, and the spring pin 63 can be moved forward and backward by expansion and contraction of a spring.

When oil is supplied to the hydraulic piston 61, the hydraulic piston 61 is moved forward against a spring force of the spring pin 63. As the hydraulic piston 61 is moved forward, the return pin 58 is pushed by the coupling pin 56, and a part of the coupling pin 56 enters the storage hole of the rocker arm 46*a* from the storage hole of the rocker arm 46*b* to couple the rocker arms 46*a* and 46*b*. When the oil is discharged from the hydraulic piston 61, the hydraulic piston 61 is moved backward by the spring force of the spring pin 63. As the hydraulic piston 61 is moved backward, the coupling pin 56 is pushed back by the return pin 58, and a part of the coupling pin 56 is pulled out of the storage hole of the rocker arm 46*a* to separate the rocker arms 46*a* and 46*b*.

Figure 4A:
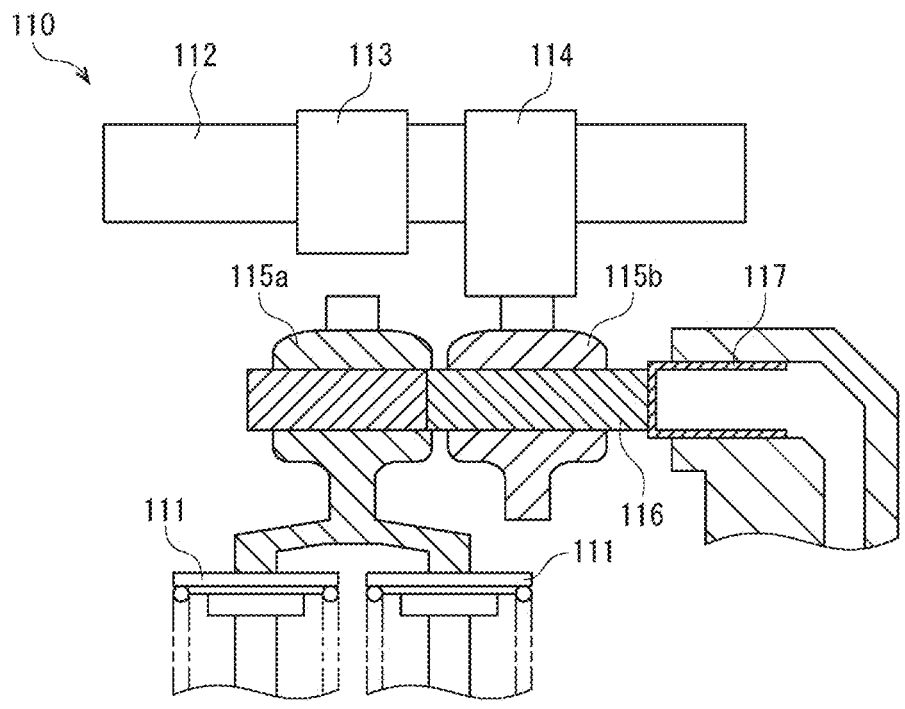
FIGS. 4A and 4B show an example of a cam switching operation of a variable valve device according to Comparative Example 1.
Figure 4B:
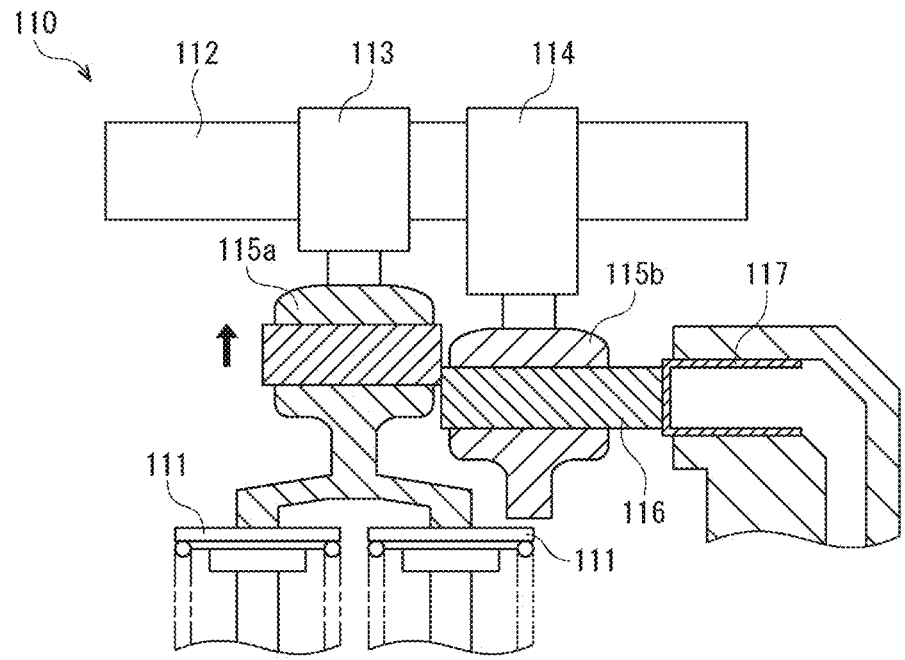

As shown in FIG. 4A, in a variable valve device 110 according to Comparative Example 1, a coupling pin 116 is moved by a hydraulic piston 117 regardless of a valve lift. In a case where a low-speed cam 113 is switched to a high-speed cam 114, when the coupling pin 116 protrudes out of a storage hole of a rocker arm 115*b* immediately before a valve lift of an intake valve 111, insertion of the coupling pin 116 into a storage hole of a rocker arm 115*a* is shallow. As shown in FIG. 4B, when the coupling pin 116 is pulled out of the storage hole of the rocker arm 115*a* during a valve lift by the high-speed cam 114, the rocker arm 115*a* may collide with the low-speed cam 113 to generate abnormal noises, and durability of the variable valve device 110 may be reduced. When the coupling pin 116 is pulled out of the storage hole of the rocker arm 115*a*, an opening of the storage hole may be worn out.

Figure 5A:
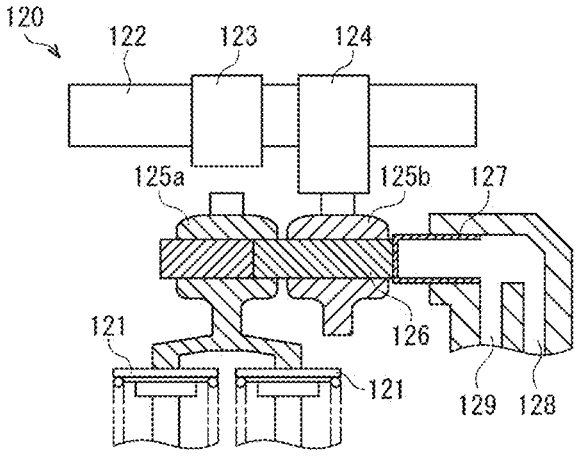
FIGS. 5A, 5B, and 5C show an example of a cam switching operation of a variable valve device according to Comparative Example 2.

As shown in FIG. 5A, at the time of switching from a low-speed cam 123 to a high-speed cam 124, oil may be supplied from an actuation passage 128 to a hydraulic piston 127 in a predetermined period after a valve lift ends. Accordingly, a coupling operation of a pair of rocker arms 125*a* and 125*b* is not hindered by a valve lift. However, since only the actuation passage 128 is used, oil is intermittently supplied, so that the coupling state between the pair of rocker arms 125*a* and 125*b* is not stable. Therefore, a direct passage 129 that is opened after the oil is supplied from the actuation passage 128 is provided, and the oil is supplied from the direct passage 129 to the hydraulic piston 127, thereby stabilizing the coupling state.

Figure 5B:
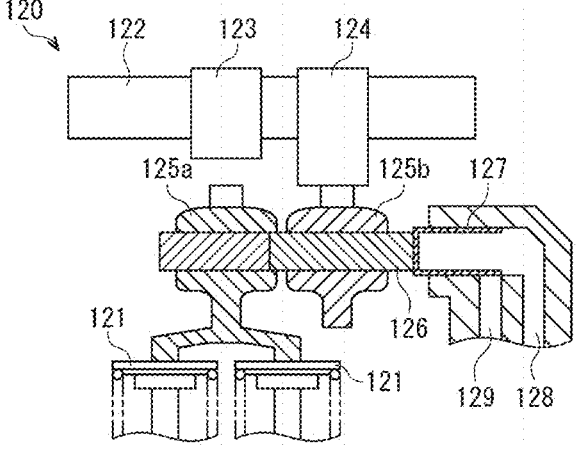
Figure 5C:
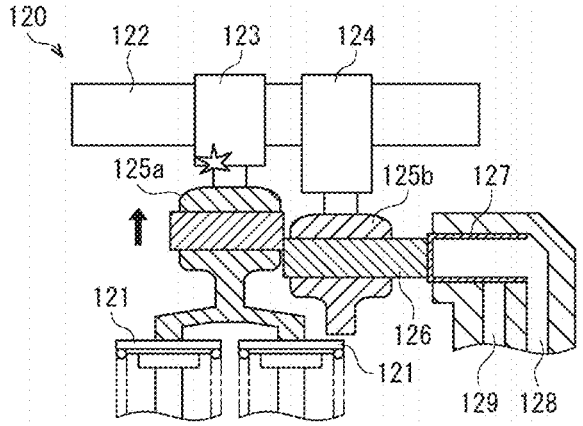

As shown in FIG. 5B, at the time of switching from the high-speed cam 124 to the low-speed cam 123, the oil in the actuation passage 128 and the direct passage 129 is discharged, and the hydraulic piston 127 is moved backward. The direct passage 129 is closed during backward movement of the hydraulic piston 127. As shown in FIG. 5C, since the oil is discharged from the actuation passage 128 only in a predetermined period after a valve lift ends, a valve lift starts before the movement of the hydraulic piston 127 stops and a coupling pin 126 is pulled out of the rocker arm 125*a*. When the coupling pin 126 is pulled out of a storage hole of the rocker arm 125*a* during a valve lift, there are various problems such as generation of abnormal noises as described above.

Figure 6:
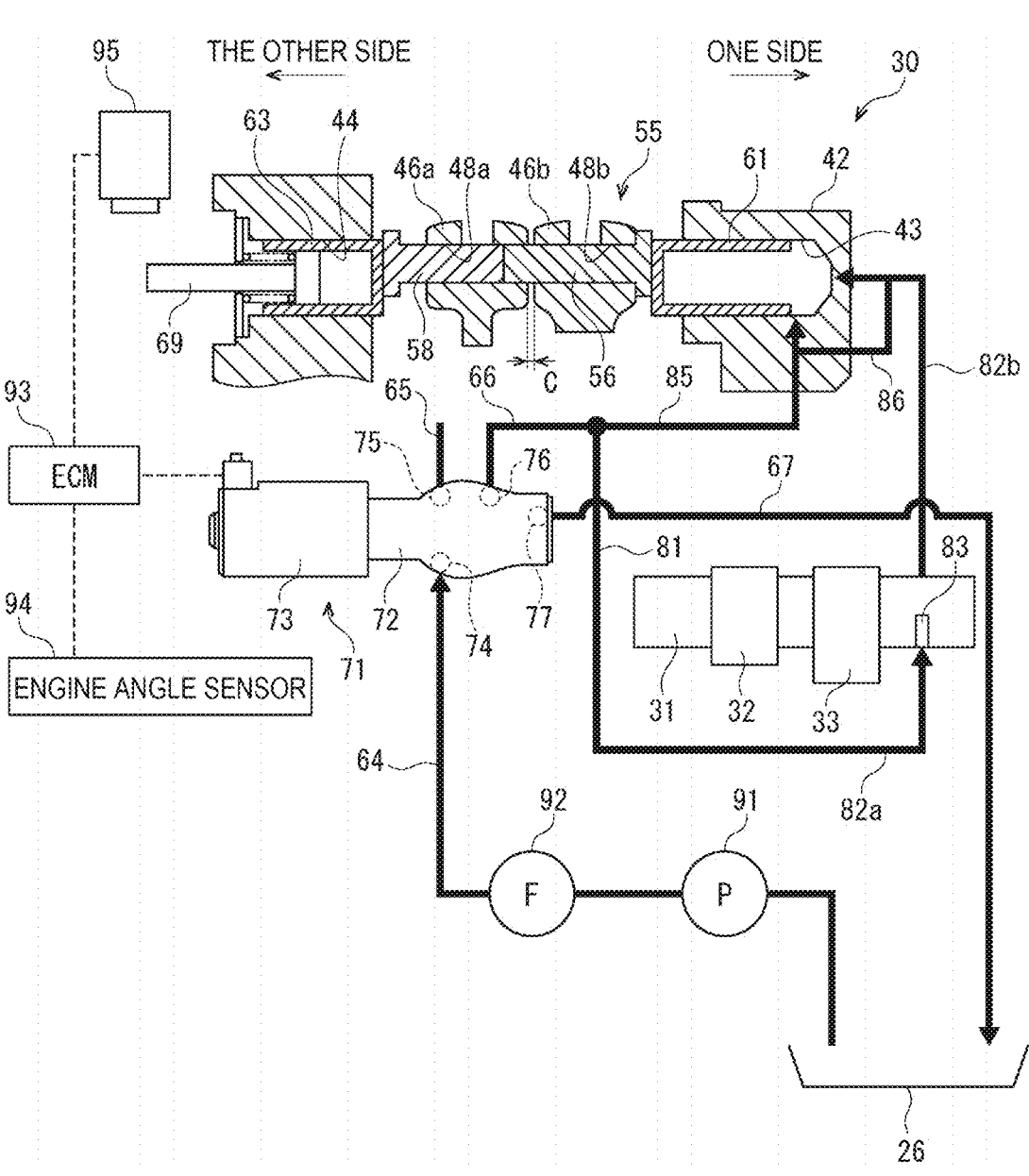
FIG. 6 is a schematic view showing the variable valve device according to the present embodiment.

Accordingly, in the variable valve device 30 according to the present embodiment, an actuation passage 81 and a direct passage 85 are coupled by a bypass passage 86, and oil is discharged from the hydraulic piston 61 in a period other than a predetermined period after a valve lift ends at the time of switching from the high-speed cam 33 to the low-speed cam 32 (see FIG. 6). Even when the direct passage 85 is closed by the hydraulic piston 61 and only the actuation passage 81 is coupled to the hydraulic piston 61, the oil is continuously discharged from the hydraulic piston 61 through the bypass passage 86 regardless of an end timing of a valve lift. Since the pair of rocker arms 46*a* and 46*b* are smoothly separated from each other, generation of abnormal noises can be prevented, and durability of the variable valve device 30 can be improved.

Figure 7:
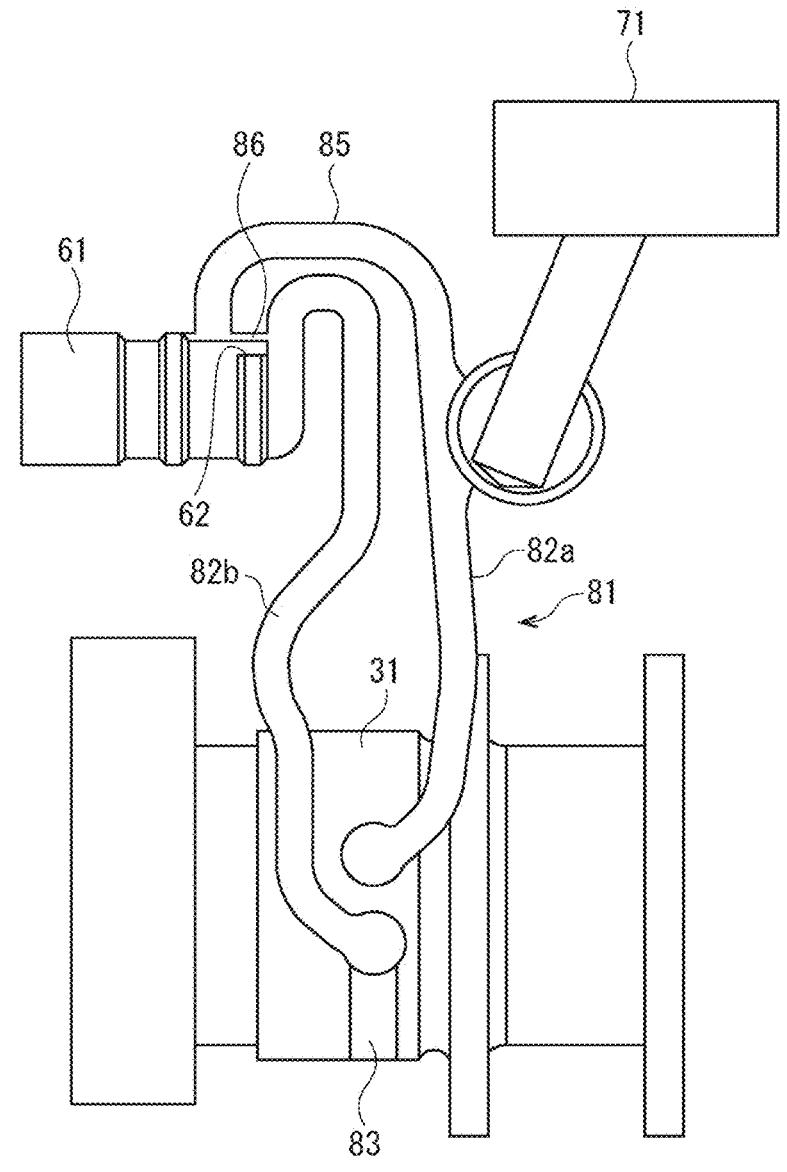
FIG. 7 is a schematic view showing an actuation passage and a direct passage according to the present embodiment.
Figure 7:
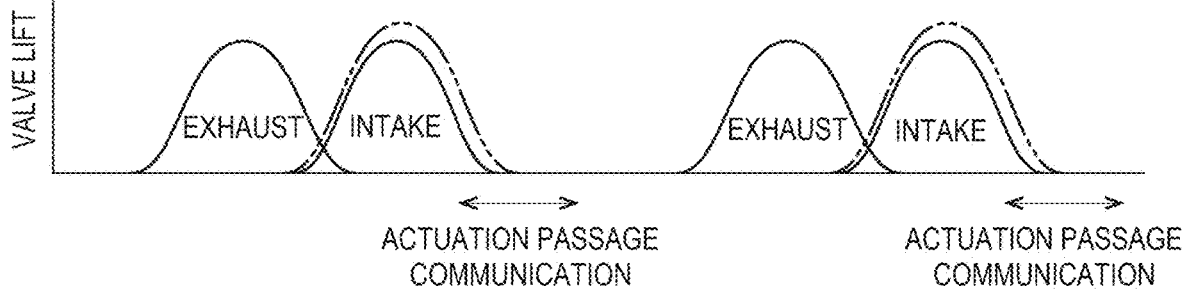
Figure 8:
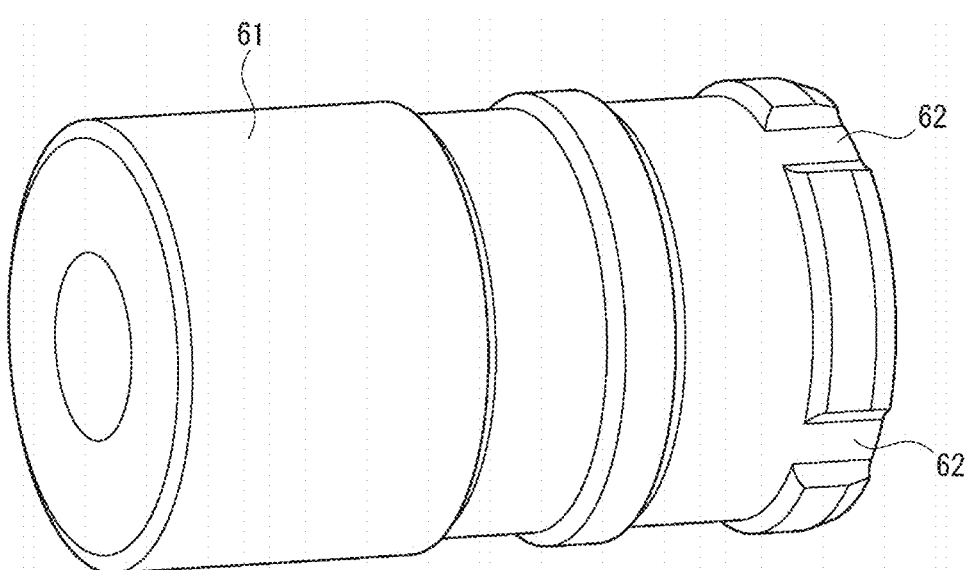
FIG. 8 is a perspective view showing a hydraulic piston according to the present embodiment.

Hereinafter, the variable valve device according to the present embodiment will be described with reference to FIGS. 6 to 8. FIG. 6 is a schematic diagram showing the variable valve device according to the present embodiment. FIG. 7 is a schematic view showing the actuation passage and the direct passage according to the present embodiment. FIG. 8 is a perspective view showing the hydraulic piston according to the present embodiment.

As shown in FIG. 6, in the variable valve device 30, an oil supply path 64 extends from the oil pan 26 toward the oil control valve 71. Oil is pumped up from the oil pan 26 by an oil pump 91 provided in an intermediate portion of the oil supply path 64, and the oil is supplied to the oil control valve 71 through an oil filter 92. The oil control valve 71 includes a valve housing 72 that accommodates a valve spool (not shown), and a solenoid 73 that moves the valve spool forward and backward. The valve spool is moved forward and backward by the solenoid 73 to switch an oil passage in the oil control valve 71.

An input port 74, a low-speed port 75, a high-speed port 76, and a drain port 77 are formed in the valve housing 72. The oil supply path 64 communicates with the input port 74, a dead end passage 65 communicates with the low-speed port 75, a switching passage 66 communicates with the high-speed port 76, and a drain passage 67 communicates with the drain port 77. A discharge destination of the dead end passage 65 is closed, and the switching passage 66 extends from the oil control valve 71 toward the switching mechanism 55. The drain passage 67 extends from the oil control valve 71 to a position above the oil pan 26, and oil is dropped from an outlet of the drain passage 67 to the oil pan 26.

By moving the valve spool of the oil control valve 71, the input port 74 communicates with one of the low-speed port 75 and the high-speed port 76, and the drain port 77 communicates with the other one of the low-speed port 75 and the high-speed port 76. Oil is output from the oil control valve 71 to one of the dead end passage 65 and the switching passage 66, and remaining oil is discharged from the other one of the dead end passage 65 and the switching passage 66 to the oil control valve 71 (the drain passage 67). In this manner, oil pressure applied to the switching mechanism 55 is controlled by the oil control valve 71.

The switching passage 66 is divided into the actuation passage (a first oil passage) 81 and the direct passage (a second oil passage) 85. Both the actuation passage 81 and the direct passage 85 extend from the oil control valve 71 to the hydraulic piston 61 of the switching mechanism 55. A part of the actuation passage 81 is formed by an oil groove 83 through which oil is allowed to pass at a predetermined rotation phase of the camshaft 31. As described above, the low-speed cam 32, the high-speed cam 33, and the exhaust cam 34 (not shown in FIG. 6) are formed on the camshaft 31, and the oil groove 83 is formed in a part of an outer circumferential surface of the camshaft 31 supported by the cam housing 41 (see FIG. 2).

The actuation passage 81 is divided into an upstream passage 82a and a downstream passage 82b with the oil groove 83 of the camshaft 31 interposed therebetween. By rotating the camshaft 31, communication and separation between the upstream passage 82a and the downstream passage 82b of the actuation passage 81 are alternately repeated. Therefore, oil is intermittently supplied from the oil control valve 71 to the hydraulic piston 61, and oil is intermittently discharged from the hydraulic piston 61 to the oil control valve 71. A predetermined rotation phase of the camshaft 31 is set from an end timing of a valve lift to a timing before the start of a subsequent valve lift.

The direct passage 85 directly extends from the oil control valve 71 to the hydraulic piston 61 without passing through the oil groove 83 of the camshaft 31. Therefore, oil is continuously supplied from the oil control valve 71 to the hydraulic piston 61 through the direct passage 85, and oil is continuously discharged from the hydraulic piston 61 to the oil control valve 71 through the direct passage 85. The direct passage 85 is opened and closed by the hydraulic piston 61. The direct passage 85 is opened during forward movement of the hydraulic piston 61, and the direct passage 85 is closed during backward movement of the hydraulic piston 61.

The bypass passage 86 for bypassing the oil groove 83 in an intermediate portion of the actuation passage 81 when the direct passage 85 is closed is formed. The actuation passage 81 and the direct passage 85 are coupled to each other via the bypass passage 86, and even when the direct passage 85 is closed by the hydraulic piston 61, oil is continuously discharged from the hydraulic piston 61 to the oil control valve 71 while bypassing the oil groove 83. As details will be described later, the hydraulic piston 61 is moved in response to oil supply through the actuation passage 81 as a trigger, and the hydraulic piston 61 is maintained in a state in which the hydraulic piston 61 is pushed by oil supply through the direct passage 85.

As described above, the rocker arms 46a and 46b are adjacent to each other, and upper portions of the rocker arms 46a and 46b are adjacent to each other with a slight gap C therebetween. Storage holes 48a and 48b parallel to the camshaft 31 are formed in the upper portions of the rocker arms 46a and 46b. Hole diameters of the storage hole 48a of the rocker arm 46a and the storage hole 48b of the rocker arm 46b match with each other, and the storage holes 48a and 48b are coaxially formed such that the storage holes 48a and 48b communicate with each other in a state in which the rocker arm 46a is not lifted up. The coupling pin 56 is installed in the storage hole 48b of the rocker arm 46b, and the return pin 58 is installed in the storage hole 48a of the rocker arm 46a. A tip end of the return pin 58 is in contact with a tip end of the coupling pin 56.

A sliding chamber 43 is formed in the upper housing 42 on a side closer to the one side than the rocker arm 46b. The hydraulic piston 61 is installed in the sliding chamber 43. A pressing surface of the hydraulic piston 61 is in contact with the coupling pin 56, and the coupling pin 56 is moved to the other side by the hydraulic piston 61. A sliding chamber 44 is formed in the upper housing 42 on a side closer to the other side than the rocker arm 46a. The spring pin 63 is installed in the sliding chamber 44. A pressing surface of the spring pin 63 is in contact with the return pin 58, and the return pin 58 is returned to the one side by the spring pin 63. A sensing arm 69 extends from the spring pin 63 to the other side.

The switching mechanism 55 switches the coupling state of the rocker arms 46a and 46b by moving the coupling pin 56 by oil pressure. As described above, in the separation state of the rocker arms 46a and 46b, the pair of intake valves 35 are operated by the low-speed cam 32 via the rocker arms 46a. In the coupling state of the rocker arms 46a and 46b, the pair of intake valves 35 are operated by the high-speed cam 33 via the rocker arms 46a and 46b. In this manner, the switching mechanism 55 switches cams that move the pair of intake valves 35 by switching the coupling state of the rocker arms 46a and 46b by the coupling pin 56.

The variable valve device 30 includes an engine control module (ECM) 93, an engine angle sensor 94, and a switching sensor 95. The engine angle sensor 94 detects an engine rotation speed, when the engine rotation speed is a predetermined rotation speed or more, the ECM 93 outputs a coupling command signal to the solenoid 73, and when the engine rotation speed is less than the predetermined rotation speed, the ECM 93 outputs a release command signal to the solenoid 73. The switching sensor 95 detects switching between the coupling state and the separation state of the rocker arms 46a and 46b based on movement of a tip end of the sensing arm 69. A failure of the variable valve device 30 such as a defective switching operation can be determined by comparing a command signal from the ECM 93 and a detection signal from the switching sensor 95.

As shown in FIG. 7, the upstream passage 82a of the actuation passage 81 extends from the oil control valve 71 to the camshaft 31, and the downstream passage 82b of the actuation passage 81 extends from the camshaft 31 to the hydraulic piston 61. A downstream end of the upstream passage 82a and an upstream end of the downstream passage 82b are positioned on the same circumference on the outer circumferential surface of the camshaft 31. The oil groove 83 is formed in a circumferential direction on the circumference of the outer circumferential surface of the camshaft 31. The direct passage 85 extends from the oil control valve 71 to the hydraulic piston 61, and the direct passage 85 is formed to be shorter than the actuation passage 81.

When oil is supplied to the hydraulic piston 61, the oil is allowed to pass through the actuation passage 81 only in a period in which the upstream passage 82a and the downstream passage 82b communicate with each other via the oil groove 83. The oil groove 83 is formed such that the upstream passage 82a and the downstream passage 82b communicate with each other at an end timing of a valve lift, and the upstream passage 82a and the downstream passage 82b are separated from each other before a valve lift starts. That is, the oil groove 83 is formed such that oil starts to be supplied from the oil control valve 71 to the hydraulic piston 61 at an end timing of a valve lift and the oil supply to the hydraulic piston 61 ends before a valve lift starts.

Since the oil starts to be supplied to the hydraulic piston 61 at an end timing of a valve lift, a coupling operation of the rocker arms 46a and 46b is not hindered by the valve lift. The coupling operation of the rocker arms 46a and 46b ends before a valve lift starts, and the rocker arms 46a and 46b are not coupled in the middle of a valve lift. After the oil is supplied from the actuation passage 81 to the hydraulic piston 61, the oil is supplied from the direct passage 85 to the hydraulic piston 61. The hydraulic piston 61 may be moved by intermittent oil supply from the actuation passage 81 only. However, according to this configuration, the hydraulic piston 61 is stably held by oil supply from the direct passage 85.

When the oil is discharged from the hydraulic piston 61, the oil is discharged through the actuation passage 81 and the direct passage 85. The direct passage 85 is closed by the hydraulic piston 61 during discharging of the oil, and the oil could be discharged intermittently from the actuation passage 81 only. In contrast, in the present embodiment, the actuation passage 81 and the direct passage 85 are coupled via the bypass passage 86, and the oil is continuously discharged from the hydraulic piston 61 through the actuation passage 81, the bypass passage 86, and the direct passage 85. Therefore, the hydraulic piston 61 is quickly returned to an initial position, and a valve lift of the high-speed cam 33 is not started in a state in which the rocker arms 46a and 46b are not completely separated.

A downstream end of the actuation passage 81 and a downstream end of the direct passage 85 are adjacent to each other, and the downstream end of the actuation passage 81 and the downstream end of the direct passage 85 communicate with each other via the bypass passage 86. The bypass passage 86 is short, the oil flows from the actuation passage 81 to the direct passage 85 through the bypass passage 86, and the oil is quickly discharged from the hydraulic piston 61. Oil passes through the bypass passage 86 not only when the oil is discharged from the hydraulic piston 61 but also when the oil is supplied to the hydraulic piston 61. A cross-sectional area of the bypass passage 86 is formed to be smaller than cross-sectional areas of the actuation passage 81 and the direct passage 85, thereby reducing an influence of the bypass passage 86.

As shown in FIGS. 7 and 8, the bypass passage 86 according to the present embodiment is formed by communication grooves 62 provided in an outer circumferential surface of the hydraulic piston 61. A rear end portion of the outer circumferential surface of the hydraulic piston 61 bulges in an annular shape so as to partition the downstream end of the actuation passage 81 and the downstream end of the direct passage 85. The downstream end of the actuation passage 81 and the downstream end of the direct passage 85 are coupled to each other via the communication grooves 62 that are formed by reducing a part of the annular bulge portion. In this case, by preparing several types of the hydraulic piston 61 in which the number and a groove width of the communication grooves 62 are changed, it is possible to adjust a passing amount of oil by changing the cross-sectional area of the bypass passage 86 by replacing the hydraulic piston 61.

Figure 9A:
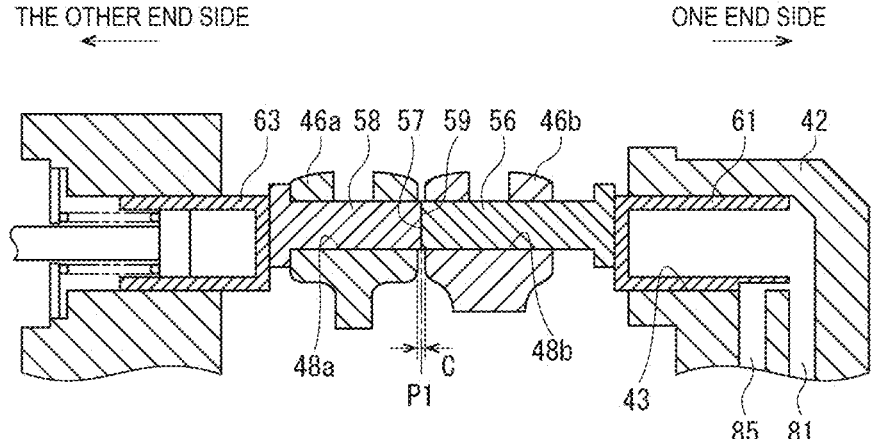
FIGS. 9A, 9B, and 9C are views showing a coupling operation of the variable valve device according to the present embodiment.
Figure 9B:
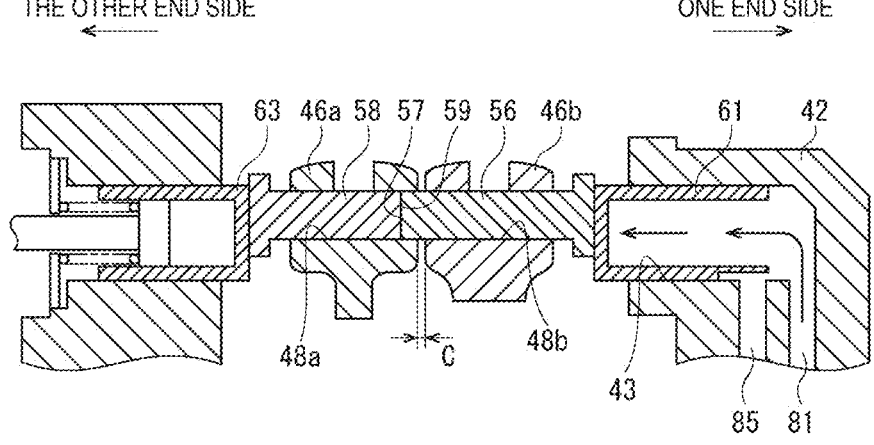
Figure 9C:
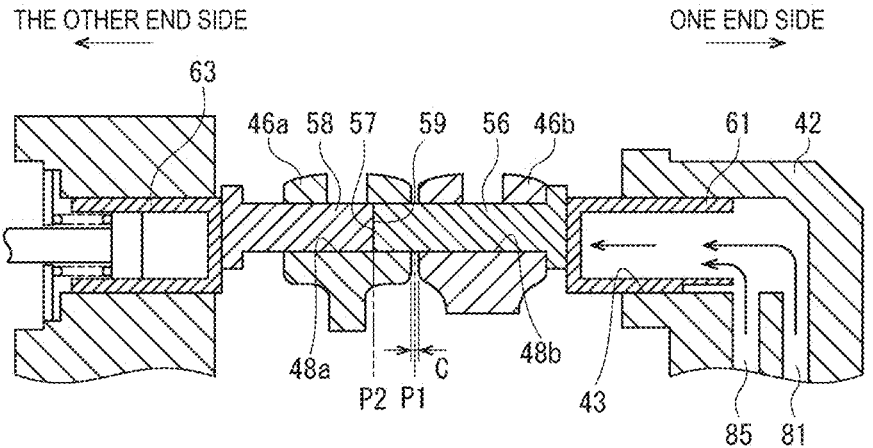
Figure 10A:
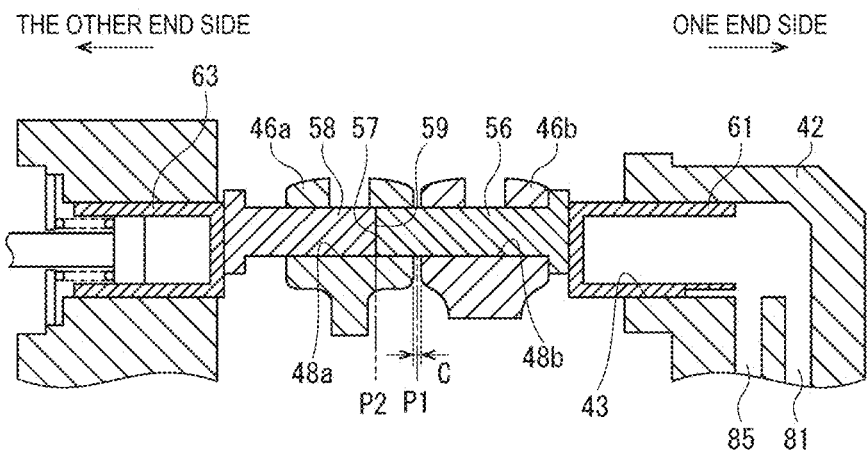
FIGS. 10A, 10B, and 10C are views showing a separation operation of the variable valve device according to the present embodiment.
Figure 10B:
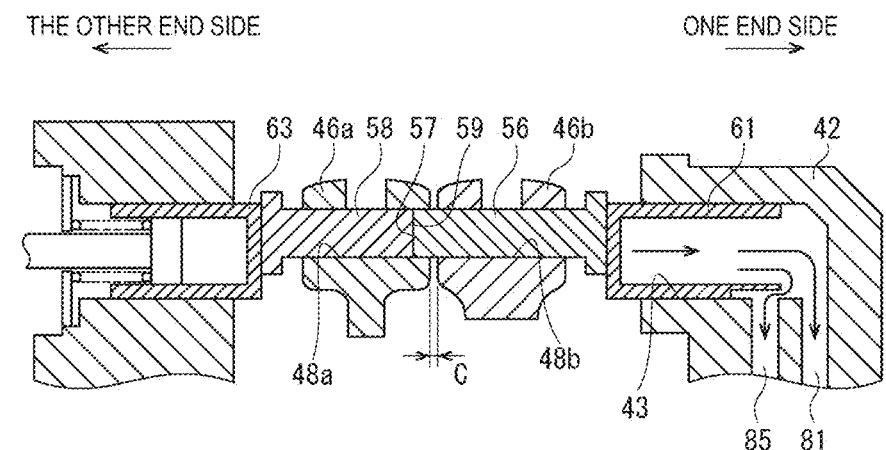
Figure 10C:
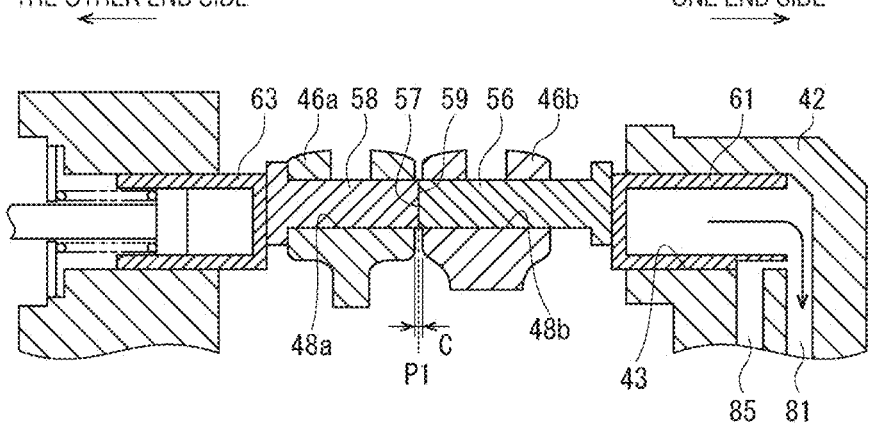

A coupling operation and a separation operation of the variable valve device will be described with reference to FIGS. 9A to 10C. FIGS. 9A, 9B, and 9C are views showing the coupling operation of the variable valve device according to the present embodiment. FIGS. 10A, 10B, and 10C are views showing the separation operation of the variable valve device according to the present embodiment. In FIGS. 9A to 10C, reference numerals in FIG. 6 are used as appropriate for convenience of description.

As shown in FIG. 9A, the hydraulic piston 61 is installed in the cylindrical sliding chamber 43 of the upper housing 42. The downstream end of the actuation passage 81 (the downstream passage 82b) is opened in a back surface of the sliding chamber 43, and the downstream end of the direct passage 85 is opened in an inner circumferential surface of the sliding chamber 43. A supply direction of the oil from the actuation passage 81 to the hydraulic piston 61 is directed to a forward and backward direction of the hydraulic piston 61, and a supply direction of the oil from the direct passage 85 to the hydraulic piston 61 is directed to a radial direction of the hydraulic piston 61. During a low-speed operation, the hydraulic piston 61 is moved backward, and the downstream end of the direct passage 85 is closed by the outer circumferential surface of the hydraulic piston 61.

During the low-speed operation, the oil is not supplied from the oil control valve 71 to the hydraulic piston 61. No pressing force acts on the coupling pin 56 from the hydraulic piston 61, and a spring force of the spring pin 63 acts on the return pin 58. A flange of the return pin 58 abuts against the rocker arm 46a, and the return pin 58 is positioned at an initial position. At this time, a tip end 57 of the coupling pin 56 is in contact with a tip end 59 of the return pin 58 at a separation position P1 in the gap C between the rocker arms 46a and 46b. The tip end 57 of the coupling pin 56 is positioned in the gap C between the rocker arms 46a and 46b, and the rocker arms 46a and 46b are separated from each other.

When switching from the low-speed operation to a high-speed operation is started, oil starts to be supplied from the oil control valve 71 to the hydraulic piston 61. At this time, the oil is supplied to the hydraulic piston 61 while the upstream passage 82a and the downstream passage 82b of the actuation passage 81 communicate with each other via the oil groove 83 of the camshaft 31, that is, at a predetermined rotation phase of the camshaft 31 avoiding a valve lift. When oil pressure acts on the hydraulic piston 61, the hydraulic piston 61 is moved forward against a repulsive force of the spring pin 63, and the coupling pin 56 is pushed by the hydraulic piston 61.

As shown in FIG. 9B, in an initial stage of the switching from the low-speed operation to the high-speed operation, the return pin 58 is pushed out by the coupling pin 56 along the forward movement of the hydraulic piston 61, and a part of the coupling pin 56 starts to enter the storage hole 48a of the rocker arm 46a. At this time, the coupling pin 56 shallowly enters the storage hole 48a of the rocker arm 46a, and the rocker arms 46a and 46b are not completely coupled to each other. Since a valve lift of the intake valve 35 does not occur, the coupling pin 56 is not pulled out from the rocker arm 46a due to a valve lift during the coupling of the rocker arms 46a and 46b.

As shown in FIG. 9C, after the switching to the high-speed operation, the hydraulic piston 61 is pushed to a maximum stroke position by the oil pressure. The tip end 57 of the coupling pin 56 is positioned at a coupling position P2 of the rocker arm 46a. A part of the coupling pin 56 deeply enters the storage hole 48a of the rocker arm 46a, and the rocker arms 46a and 46b are coupled to each other via the coupling pin 56. The downstream end of the direct passage 85 is opened along the forward movement of the hydraulic piston 61, and the hydraulic piston 61 is held at the maximum stroke position by oil supply from the direct passage 85.

As shown in FIG. 10A, when switching from the high-speed operation to the low-speed operation is started, oil starts to be discharged from the hydraulic piston 61 to the oil control valve 71 (the drain passage 67). As the camshaft 31 rotates, the oil is discharged from the hydraulic piston 61 through the actuation passage 81, and the oil is discharged from the hydraulic piston 61 through the direct passage 85. By releasing oil pressure on the hydraulic piston 61, the hydraulic piston 61 is pushed back by the repulsive force of the spring pin 63 in a backward direction from the maximum stroke position via the return pin 58 and the coupling pin 56.

As shown in FIG. 10B, in an initial stage of the switching from the high-speed operation to the low-speed operation, the downstream end of the direct passage 85 is closed by the hydraulic piston 61 during backward movement of the hydraulic piston 61. At this time, although the actuation passage 81 does not allow oil to pass therethrough at a phase other than the predetermined rotation phase of the camshaft 31, the oil is allowed to pass from the actuation passage 81 to the direct passage 85 via the bypass passage 86. The oil is continuously discharged from the hydraulic piston 61 to the oil control valve 71 through the bypass passage 86 while bypassing the oil groove 83 (see FIG. 6) of the camshaft 31. Therefore, the hydraulic piston 61 does not stop during backward movement, and the coupling pin 56 does not stay in the storage hole 48a of the rocker arm 46a.

As shown in FIG. 10C, after the switching to the low-speed operation, the hydraulic piston 61 is pushed back to a minimum stroke position by the repulsive force of the spring pin 63. As the hydraulic piston 61 is moved backward, the tip end 57 of the coupling pin 56 is positioned at the separation position P1 of the rocker arm 46a. The coupling pin 56 is completely pulled out of the storage hole 48a of the rocker arm 46a, and the rocker arms 46a and 46b are separated from each other. No oil pressure acts on the hydraulic piston 61, and the hydraulic piston 61 is held at the minimum stroke position by a spring force of the spring pin 63.

As described above, according to the variable valve device 30 of the present embodiment, when the oil is supplied from the oil control valve 71 to the hydraulic piston 61, the hydraulic piston 61 is moved forward at the predetermined rotation phase of the camshaft 31 by the oil pressure in the actuation passage 81. When the direct passage 85 is opened during forward movement of the hydraulic piston 61 and the rocker arms 46a and 46b are coupled, the coupling state is maintained by oil pressure in the direct passage 85. On the other hand, when the oil is discharged from the hydraulic piston 61 to the oil control valve 71, the oil pressure in the actuation passage 81 and the direct passage 85 is released, and the hydraulic piston 61 is moved backward. The direct passage 85 is closed during backward movement of the hydraulic piston 61, and the oil is not allowed to pass through the oil groove 83 of the actuation passage 81 at a phase other than the predetermined rotation phase of the camshaft 31. At this time, the oil is continuously discharged from the hydraulic piston 61 through the bypass passage 86 bypassing the oil groove 83, so that the rocker arms 46a and 46b are smoothly separated from each other.

Figure 11:
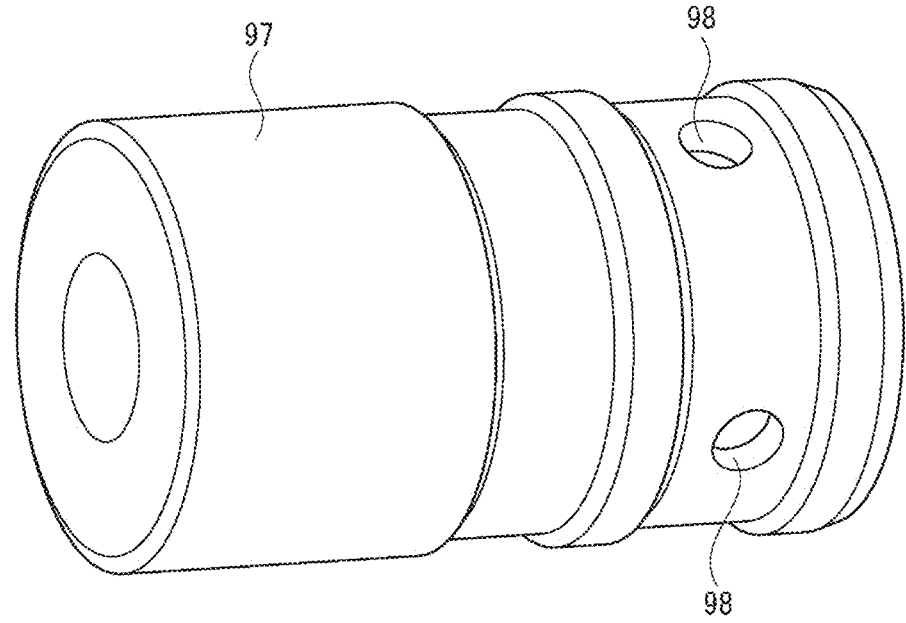
FIG. 11 is a perspective view showing a hydraulic piston according to Modification 1.

In the present embodiment, the bypass passage is formed by the communication grooves in the outer circumferential surface of the hydraulic piston. Alternatively, the bypass passage may be formed in any manner as long as the bypass passage bypasses the oil groove of the actuation passage when the direct passage is closed. For example, as shown in Modification 1 in FIG. 11, the bypass passage may be formed by through holes 98 provided in an outer circumferential surface of a hydraulic piston 97. The hydraulic piston 97 is formed in a cylindrical shape, and an actuation passage and a direct passage communicate with each other via the through holes 98. By preparing several types of the hydraulic piston 97 in which the number and a hole diameter of the through holes 98 are changed, it is possible to adjust a passing amount of oil by changing a cross-sectional area of the bypass passage by replacing the hydraulic piston 97.

Figure 12:
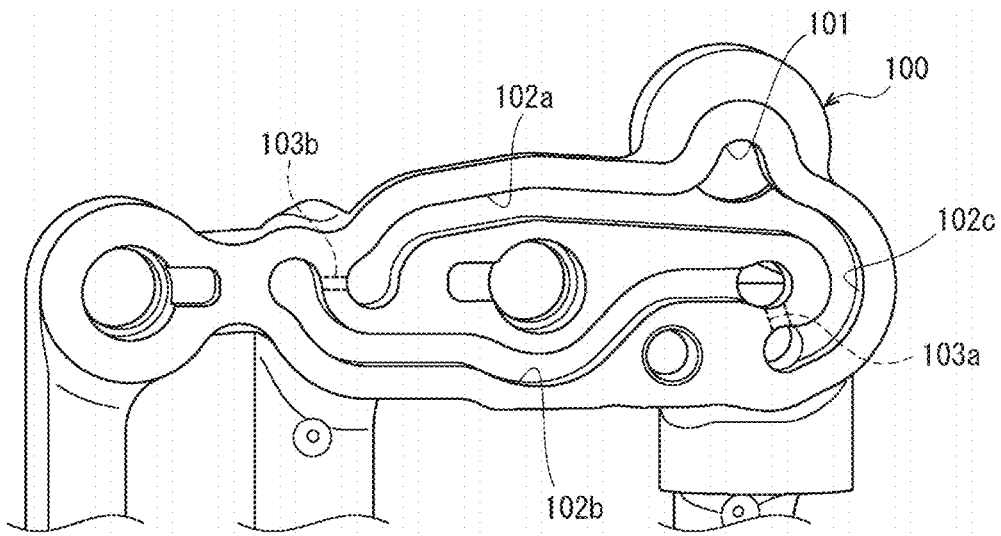
FIG. 12 is a bottom view showing an upper housing according to Modifications 2 to 5.
Figure 13A:
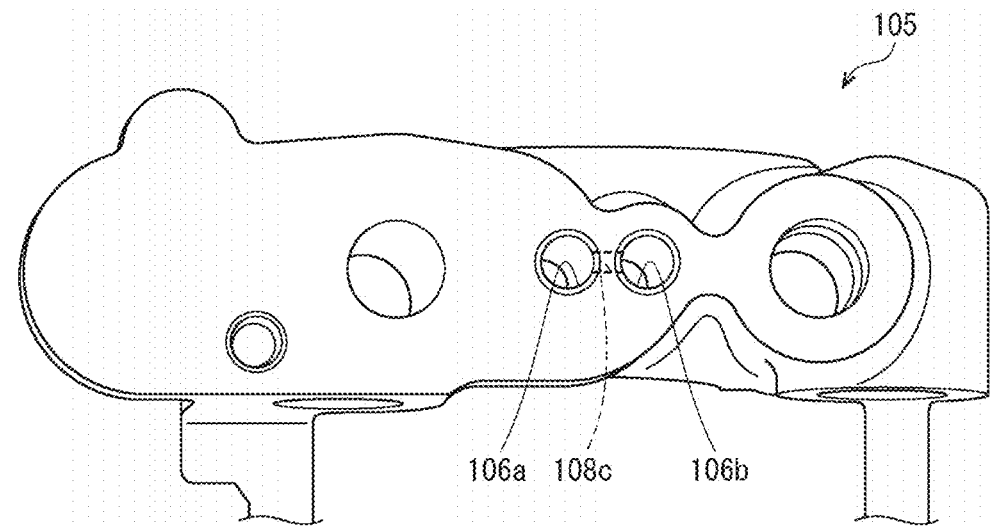
FIGS. 13A and 13B are top views showing a cam housing according to Modifications 2 to 5.
Figure 13B:
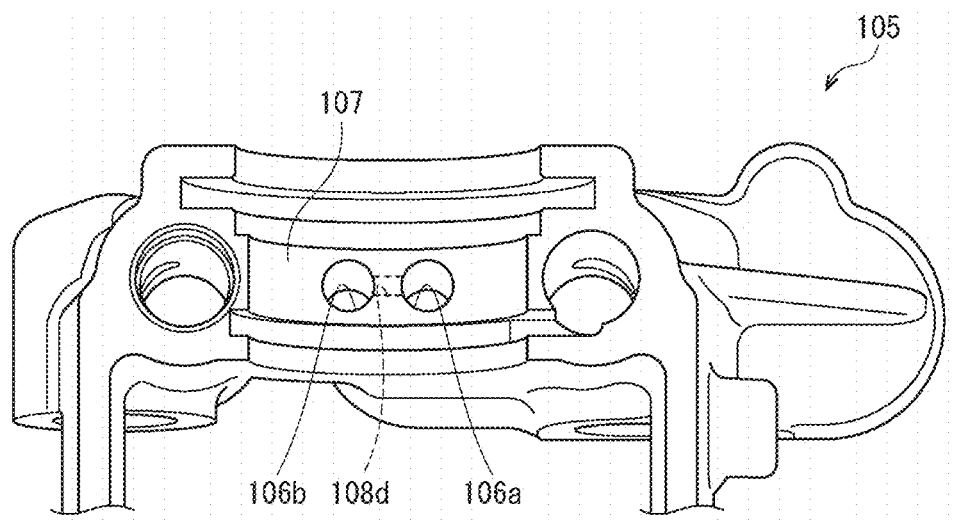

As shown in FIGS. 12 to 13B, an oil hole 101 coupled to an oil control valve (not shown) is formed in a lower surface of an upper housing 100. An oil groove 102a extends from the oil hole 101 to a position directly below a camshaft (not shown), and an oil groove 102b extends from a position adjacent to a downstream end of the oil groove 102a to the vicinity of a sliding chamber of a hydraulic piston (not shown). The downstream end of the oil groove 102a is coupled to an oil hole 106a of a cam housing 105, and an upstream end of the oil groove 102b is coupled to an oil hole 106b of the cam housing 105. The oil holes 106a and 106b pass through the cam housing 105 from an upper surface to a support surface 107 of a lower surface of the cam housing 105.

In the lower surface of the upper housing 100, an oil groove 102c extends from the oil hole 101 to the vicinity of the sliding chamber of the hydraulic piston. When the upper housing 100 is fixed to the cam housing 105, an upstream passage of an actuation passage is formed by the oil groove 102a and the oil hole 106a, and a downstream passage of the actuation passage is formed by the oil groove 102b and the oil hole 106b. A direct passage is formed by the oil groove 102c. The oil holes 106a and 106b are opened in the support surface 107 of a camshaft, and communication and separation of the oil holes 106a and 106b are repeated by an oil groove (not shown) of the camshaft.

In Modification 2, a bypass passage that couples an actuation passage and a direct passage may be formed in the lower surface of the upper housing 100. In this case, a downstream end of the oil groove 102b and a downstream end of the oil groove 102c are adjacent to each other, and downstream ends of the oil grooves 102b and 102c are coupled to each other via a narrow groove 103a indicated by a broken line. In Modification 3, a bypass passage that couples an upstream passage and a downstream passage of an actuation passage may be formed in the lower surface of the upper housing 100. In this case, a downstream end of the oil groove 102a and an upstream end of the oil groove 102b are adjacent to each other, and the downstream end of the oil groove 102a and the upstream end of the oil groove 102b are coupled to each other via a narrow groove 103b indicated by a broken line.

In Modification 4, a bypass passage that couples an upstream passage and a downstream passage of the actuation passage may be formed in an upper surface of the cam housing 105. In this case, the oil holes 106a and 106b are adjacent to each other in the upper surface of the cam housing 105, and the oil holes 106a and 106b are coupled to each other via a narrow groove 108c indicated by a broken line. In Modification 5, a bypass passage that couples an upstream passage and a downstream passage of an actuation passage may be formed in the support surface 107 of the cam housing 105. In this case, the oil holes 106a and 106b are adjacent to each other in the support surface 107 of the cam housing 105, and the oil holes 106a and 106b are coupled to each other via a narrow groove 108d indicated by a broken line.

In Modifications 2 to 5, by preparing several types of the upper housing 100 and the cam housing 105 in which a groove width, a hole diameter, and the like are changed, it is possible to adjust a passing amount of oil by changing cross-sectional areas of the actuation passage, the direct passage, and the bypass passage by replacing the upper housing 100. The bypass passage may be formed by both the communication groove and the through hole in the hydraulic piston, and the bypass passage may be formed by two or more of the narrow grooves listed above in the upper housing and the cam housing. Alternatively, the bypass passage may be formed in the hydraulic piston, the upper housing, and the cam housing.

In the present embodiment, the end timing of a valve lift is not limited to a timing when the valve lift is completely ended, and may include a timing immediately before an end when a valve lift can be regarded as being ended.

Although oil starts to be supplied from the oil control valve to the switching mechanism at the end timing of a valve lift in the present embodiment, a supply timing of the oil is not limited to the end timing of a valve lift. The oil may start to be supplied from the oil control valve to the switching mechanism in a zero range where no valve lift occurs. With such a configuration, a switching operation of a cam can also be prevented from being hindered by a valve lift.

Although a pair of rocker arms are provided on an intake side of the variable valve device in the present embodiment, a plurality of rocker arms may be provided on the intake side of the variable valve device. For example, three or more rocker arms may be provided on the intake side of the variable valve device.

Although a seesaw type rocker arm is described as an example in the present embodiment, the type of the rocker arm is not particularly limited, and a finger follower type rocker arm may be used.

Although a plurality of rocker arms are adjacent to one another in the present embodiment, the plurality of rocker arms may be separated from one another.

The variable valve device according to the present embodiment is not limited to being used in an engine of the straddle-type vehicle described above, and may be used in an engine of another type of vehicle. The straddle-type vehicle is not limited to a motorcycle, and may be any vehicle on which an engine is mounted. The straddle-type vehicle is not limited to a general vehicle in which a driver rides on a seat in a posture straddling the seat, and includes a scooter-type vehicle in which a driver rides on a seat without straddling the seat.

As described above, according to a first aspect, there is provided a variable valve device (30) configured to change a valve lift amount in a cylinder head (23). The variable valve device includes: a camshaft (31) formed with a plurality of cams (the low-speed cam 32 and the high-speed cam 33) having different valve lift amounts; a plurality of rocker arms (46a and 46b) configured to be in contact with the plurality of cams and move a valve (the intake valve 35); a switching mechanism (55) configured to couple and separate the plurality of rocker arms by oil pressure; and an oil control valve (71) configured to control the oil pressure applied to the switching mechanism. The switching mechanism includes a hydraulic piston (61) configured to be moved forward and backward by the oil pressure such that the plurality of rocker arms are coupled along forward movement of the hydraulic piston, and the plurality of rocker arms are separated along backward movement of the hydraulic piston, a first oil passage (the actuation passage 81) and a second oil passage (the direct passage 85) extend from the oil control valve to the hydraulic piston, a part of the first oil passage is formed by an oil groove (83) through which oil is allowed to pass at a predetermined rotation phase of the camshaft, the second oil passage is opened during forward movement of the hydraulic piston and is closed during backward movement of the hydraulic piston, and a bypass passage (86) configured to bypass the oil groove when the second oil passage is closed is provided. According to this configuration, when the oil is supplied from the oil control valve to the hydraulic piston, the hydraulic piston is moved forward at a predetermined rotation phase of the camshaft by oil pressure in the first oil passage. When the second oil passage is opened during forward movement of the hydraulic piston and the plurality of rocker arms are coupled, a coupling state is maintained by oil pressure in the second oil passage. On the other hand, when the oil is discharged from the hydraulic piston to the oil control valve, the oil pressure in the first and second oil passages is released and the hydraulic piston is moved backward. The second oil passage is closed during backward movement of the hydraulic piston, and the oil groove of the first oil passage does not allow the oil to pass therethrough at a phase other than the predetermined rotation phase of the camshaft. At this time, the oil is continuously discharged from the hydraulic piston through the bypass passage that bypasses the oil groove, so that the plurality of rocker arms are smoothly separated from one another.

According to a second aspect, in the first aspect, a cross-sectional area of the bypass passage is smaller than a cross-sectional area of the first oil passage and a cross-sectional area of the second oil passage. According to this configuration, an influence of the bypass passage on oil supply to the hydraulic piston can be reduced.

According to a third aspect, in the first or second aspect, a downstream end of the first oil passage and a downstream end of the second oil passage are positioned adjacent to each other, and the downstream end of the first oil passage and the downstream end of the second oil passage are coupled to each other via the bypass passage. According to this configuration, the bypass passage can be shortened. The oil flows from the first oil passage to the second oil passage through the bypass passage, and the oil can be quickly discharged from the hydraulic piston.

According to a fourth aspect, in the third aspect, the bypass passage is formed by a communication groove (62) provided in an outer circumferential surface of the hydraulic piston. According to this configuration, by preparing several types of the hydraulic piston in which the number and a groove width of the communication groove are changed, it is possible to adjust a passing amount of the oil by changing the cross-sectional area of the bypass passage by replacing the hydraulic piston.

According to a fifth aspect, in the third or fourth aspect, the bypass passage is formed by a through hole (98) provided in an outer circumferential surface of the hydraulic piston (97). According to this configuration, by preparing several types of the hydraulic piston in which the number and a hole diameter of the through hole are changed, it is possible to adjust a passing amount of the oil by changing the cross-sectional area of the bypass passage by replacing the hydraulic piston.

According to a sixth aspect, in any one aspect of the first to fifth aspects, the variable valve device further includes a cam housing (105) configured to support the camshaft in a rotatable manner, and an upper housing (100) attached to an upper surface of the cam housing. The first oil passage, the second oil passage, and the bypass passage configured to couple the first oil passage and the second oil passage are formed in the upper housing. According to this configuration, by preparing several types of the upper housing in which a passage width is changed, it is possible to adjust a passing amount of the oil by changing cross-sectional areas of the first and second oil passages and the cross-sectional area of the bypass passage by replacing the upper housing.

According to a seventh aspect, in any one aspect of the first to fifth aspects, the variable valve device further includes a cam housing configured to support the camshaft in a rotatable manner, and an upper housing attached to an upper surface of the cam housing. The first oil passage, the second oil passage, and the bypass passage are formed in the cam housing and/or the upper housing, and an upstream side and a downstream side of the first oil passage are coupled via the bypass passage with the oil groove of the camshaft interposed between the upstream side and the downstream side. According to this configuration, the oil flows from the downstream side to the upstream side of the first oil passage through the bypass passage, and the oil can be quickly discharged from the hydraulic piston.

According to an eighth aspect, in any one aspect of the first to seventh aspects, the oil groove is formed such that the oil starts to be supplied from the oil control valve to the switching mechanism at an end timing of a valve lift or in a zero range where no valve lift occurs. According to this configuration, since the oil starts to be supplied from the oil control valve to the switching mechanism at the end timing of a valve lift or in the zero range, a coupling operation of the plurality of rocker arms is not hindered by a valve lift.

Although the present embodiment has been described, a part or all of the embodiment and modifications described above may be combined as another embodiment.

The technique according to the present disclosure is not limited to the embodiment described above, and may be variously changed, replaced, or modified without departing from the gist of the technical concept. Further, the present disclosure may be implemented by other methods as long as the technical concept can be implemented by the methods through advance of the technique or other derivative techniques. Therefore, the claims cover all embodiments that may fall within the scope of the technical concept.

What is claimed is:

1. A variable valve device configured to change a valve lift amount in a cylinder head, the variable valve device comprising:
   a camshaft formed with a plurality of cams having different valve lift amounts;
   a plurality of rocker arms configured to be in contact with the plurality of cams and move a valve;
   a switching mechanism configured to couple and separate the plurality of rocker arms by oil pressure; and
   an oil control valve configured to control the oil pressure applied to the switching mechanism,
   wherein the switching mechanism includes a hydraulic piston configured to be moved forward and backward by the oil pressure such that the plurality of rocker arms are coupled along forward movement of the hydraulic piston, and the plurality of rocker arms are separated along backward movement of the hydraulic piston,
   wherein a first oil passage and a second oil passage extend from the oil control valve to the hydraulic piston,
   wherein a part of the first oil passage is formed by an oil groove through which oil is allowed to pass at a predetermined rotation phase of the camshaft, wherein the second oil passage is opened during forward movement of the hydraulic piston and is closed during backward movement of the hydraulic piston, and
   wherein a bypass passage configured to bypass the oil groove when the second oil passage is closed is provided.

2. The variable valve device according to claim 1,
   wherein a cross-sectional area of the bypass passage is smaller than a cross-sectional area of the first oil passage and a cross-sectional area of the second oil passage.

3. The variable valve device according to claim 1,
   wherein a downstream end of the first oil passage and a downstream end of the second oil passage are positioned adjacent to each other, and
   wherein the downstream end of the first oil passage and the downstream end of the second oil passage are coupled to each other via the bypass passage.

4. The variable valve device according to claim 3,
   wherein the bypass passage is formed by a communication groove provided in an outer circumferential surface of the hydraulic piston.

5. The variable valve device according to claim 3,
   wherein the bypass passage is formed by a through hole provided in an outer circumferential surface of the hydraulic piston.

6. The variable valve device according to claim 1, further comprising:
   a cam housing configured to support the camshaft in a rotatable manner; and
   an upper housing attached to an upper surface of the cam housing,
   wherein the first oil passage, the second oil passage, and the bypass passage configured to couple the first oil passage and the second oil passage are formed in the upper housing.

7. The variable valve device according to claim 1, further comprising:
   a cam housing configured to support the camshaft in a rotatable manner; and
   an upper housing attached to an upper surface of the cam housing,
   wherein the first oil passage, the second oil passage, and the bypass passage are formed in the cam housing and/or the upper housing, and
   wherein an upstream side and a downstream side of the first oil passage are coupled via the bypass passage with the oil groove of the camshaft interposed between the upstream side and the downstream side.

8. The variable valve device according to claim 1,
   wherein the oil groove is formed such that the oil starts to be supplied from the oil control valve to the switching mechanism at an end timing of a valve lift or in a zero range where no valve lift occurs.

* * * * *